United States Patent
Chow et al.

(10) Patent No.: US 7,395,433 B2
(45) Date of Patent: Jul. 1, 2008

(54) METHOD AND SYSTEM FOR SUSTAINABLE DIGITAL WATERMARKING

(75) Inventors: Stanley T. Chow, Nepean (CA); Harold J. Johnson, Nepean (CA)

(73) Assignee: Cloakware Corporation, Ottawa, Ontario (CA)

( * ) Notice: Subject to any disclaimer, the term of this patent is extended or adjusted under 35 U.S.C. 154(b) by 498 days.

(21) Appl. No.: 10/478,696

(22) PCT Filed: Jun. 10, 2002

(86) PCT No.: PCT/CA02/00847

§ 371 (c)(1),
(2), (4) Date: May 28, 2004

(87) PCT Pub. No.: WO02/101519

PCT Pub. Date: Dec. 19, 2002

(65) Prior Publication Data

US 2005/0021966 A1    Jan. 27, 2005

(30) Foreign Application Priority Data

Jun. 8, 2001    (CA) ................................. 2350029

(51) Int. Cl.
*H04L 9/00* (2006.01)
*H04L 9/32* (2006.01)
*G06F 11/30* (2006.01)
*G06F 12/14* (2006.01)

(52) U.S. Cl. ..................... 713/176; 713/168; 713/194

(58) Field of Classification Search ................. 713/176, 713/168, 194; 283/13; 382/276–308; 705/75
See application file for complete search history.

(56) References Cited

U.S. PATENT DOCUMENTS

| | | | | |
|---|---|---|---|---|
| 5,123,045 A | * | 6/1992 | Ostrovsky et al. | 713/190 |
| 5,875,249 A | * | 2/1999 | Mintzer et al. | 380/54 |
| 5,889,868 A | * | 3/1999 | Moskowitz et al. | 713/176 |
| 5,930,369 A | * | 7/1999 | Cox et al. | 380/54 |
| 5,991,519 A | * | 11/1999 | Benhammou et al. | 726/3 |
| 6,330,672 B1 | * | 12/2001 | Shur | 713/176 |
| 6,700,993 B1 | * | 3/2004 | Minematsu | 382/100 |

* cited by examiner

*Primary Examiner*—Nasser Moazzami
*Assistant Examiner*—Oscar A Louie
(74) *Attorney, Agent, or Firm*—Jeffrey M. Measures; Borden Ladner Gervais LLP (57) ABSTRACT

Digital marks (so-called fingerprints and watermarks) serve two basic purposes: (1) Investigative: the owner reads a fingerprint to determine how the marked entity leaked; and (2) Legal: the owner must prove in court that (a) there is a watermark (a concealed copyright message), and (b) it is the owner's. The main difficulty of item (2) is that the first use of the watermark software reveals the watermarking method to the public so that hostile parties are equipped to remove or damage its watermarks. The invention uses tamper-resistant software encoding techniques to protect the digital mark extractor algorithm, frustrating the attacks of hostile parties in two ways: the resulting code is obscure (that is, its inner workings are incomprehensible; and chaotic (that is, a modification at any point will almost certainly produce a nonsense program.

4 Claims, 4 Drawing Sheets

METHOD AND SYSTEM FOR SUSTAINABLE DIGITAL WATERMARKING

CROSS-REFERENCE TO RELATED APPLICATION

This application is a National Stage entry of International Application No. PCT/CA02/00847, filed Jun. 10, 2002, the entire specification claims and drawings of which are incorporated herewith by reference.

The present invention relates generally to computer software, and more specifically, to a method and system which allows digital watermarking algorithms to be kept secret, while still allowing ownership of marked entities to be demonstrated in public or in court.

BACKGROUND OF THE INVENTION

In recent years, personal computers and digital communication systems have become pervasive in industrialized nations. As well, the speed and power of these systems are now at the point where any subject matter including images, audio, video and software can be stored, transferred and reproduced with ease. Because these systems are digital, the storage, transfer and reproduction can be performed flawlessly; each successive copy of a digital file may be made precisely the same as the original. This is in contrast to analogue systems used in the past, where the quality of each successive copy was poorer than the previous one, and all of the known storage media deteriorated overtime.

Obviously, this ability to copy and transfer digital data with virtually no loss in quality is having a great impact on the revenues of many digital rights holders, including music, movie and software producers. Many techniques for protecting the intellectual property rights of these digital content and software producers have been proposed but have had little success. One technique that has shown particular promise is that of "digital marks".

Digital marks such as "digital fingerprints" or "watermarks" are patterns of bits (i.e. 0's and 1's) inserted into a digital file, that can be used to identify the file's owner or originator. Unlike printed watermarks, which are intended to be somewhat visible, digital watermarks are designed to be invisible. The actual bits that make up the watermark are also scattered throughout the digital file so that they cannot be identified and manipulated by an attacker.

Digital marks generally serve two basic purposes (see, for example: *Protecting ownership rights through digital watermarking*, by H. Berghel and L. O'Gorman, 1996, IEEE Computer 29:7, pp. 101-103 and *Attacks on copyright marking systems*, by Fabien A. P. Petitcolas, Ross J. Anderson, and Markus G. Kuhn, 1998, 2nd Workshop on Information Hiding, LNCS vol. 1525 (isbn 3-540-65386-4), pp. 218-238):

1. Investigative: the owner reads a fingerprint (such as a concealed serial number) to determine how the marked entity (say, a picture in jpeg format) leaked. A trail of marked entities serves the owner in the same way that a trail of fingerprints serves a police detective; so that an owner can identify persons who have purloined the owner's property; and
2. Legal: the owner must prove in court that an infringed data file contains a watermark (a concealed copyright message), and that this watermark is the owner's.

The investigative need is the easier of the two needs to meet, since everything may be kept secret: the owner need reveal nothing about how the mark was applied, and legal proof is not required. That is, there is generally no need to justify the manner in which the thief was identified, since the owner is primarily interested in asserting legal rights over a marked entity in the thief's possession.

However, addressing the legal purpose is sufficiently difficult that some consider it infeasible against a resourceful, clever attacker (see, for example: *Protecting digital media content*, by Nasir Memon and Ping Wah Wong, 1998, Communications of the ACM 41:7, pp. 34-43).

Greatly exacerbating the difficulty of addressing the legal purpose above is the fact that the first use of a watermark extraction program in a courtroom, based on a particular watermarking method, reveals the watermarking method. After the first legal justification (and hence, revelation) of the method, hostile parties are equipped to remove or damage its watermarks on a permanent basis thereafter.

In order to provide legal watermarking the owner of the watermark would proceed roughly along the lines of the following:

1. employing a watermarking method, embodied in an "injector" implementation which applies the watermark to an owned item (possibly using a secret key) and an "extractor" implementation which reveals the watermark on an owned item (requiring the secret key, if one was used by the injector program);
2. keeping secret the keys (if any) used for watermarking owned items;
3. in court, demonstrating the watermark as follows:
   a. revealing the algorithm, so it can be justified as legitimate;
   b. loading the extractor and the impugned data/software file to be analysed, and having an agent of the court or a party trusted by the court apply the secret key (if any) to the extractor. Note that the key need not be revealed; and
   c. demonstrating that the revelation of the watermark by the (now justified) extractor proves the owner's claim to be the rightful owner of the disputed item containing the watermark.

This methodology may be implemented in two major variants:

1. either keeping the injector and extractor algorithms a secret until it is necessary to disclose them during a court proceeding; or
2. publishing the injector and extractor algorithms.

If the injector and extractor algorithms had been kept secure by the owner, then the public disclosure of these algorithms will reduce the level of security that has been enjoyed before the public disclosure. If the watermarking method had already been published, then the attacker would already have had sufficient information to permit compromise of the watermarks the algorithm applies.

There is therefore a need for a watermarking method which allows legal justification of a claim to ownership of a purloined, watermarked entity, without revealing to the world at large the algorithm by which the watermark is applied or revealed.

SUMMARY OF THE INVENTION

It is therefore an object of the invention to provide a novel method and system of digital watermarking which obviates or mitigates at least one of the disadvantages of the prior art.

One aspect of the invention is broadly defined as a method for performing digital marking comprising the steps of: developing a digital mark injector program for inserting a digital mark into a digital file; developing a complementary digital mark extractor program for identifying the digital mark in the digital file; and encoding the digital mark extractor program using tamper-resistant software encoding techniques.

Another aspect of the invention is defined as a system for performing digital marking comprising a computer operable to perform the steps of: developing a digital mark injector program for inserting a digital mark into a digital file; developing a complementary digital mark extractor program for identifying the digital mark in the digital file; and encoding the digital mark extractor program using tamper-resistant software encoding techniques.

BRIEF DESCRIPTION OF THE DRAWINGS

These and other features of the invention will become more apparent from the following description in which reference is made to the appended drawings in which.

DESCRIPTION OF THE INVENTION

Figure 1:
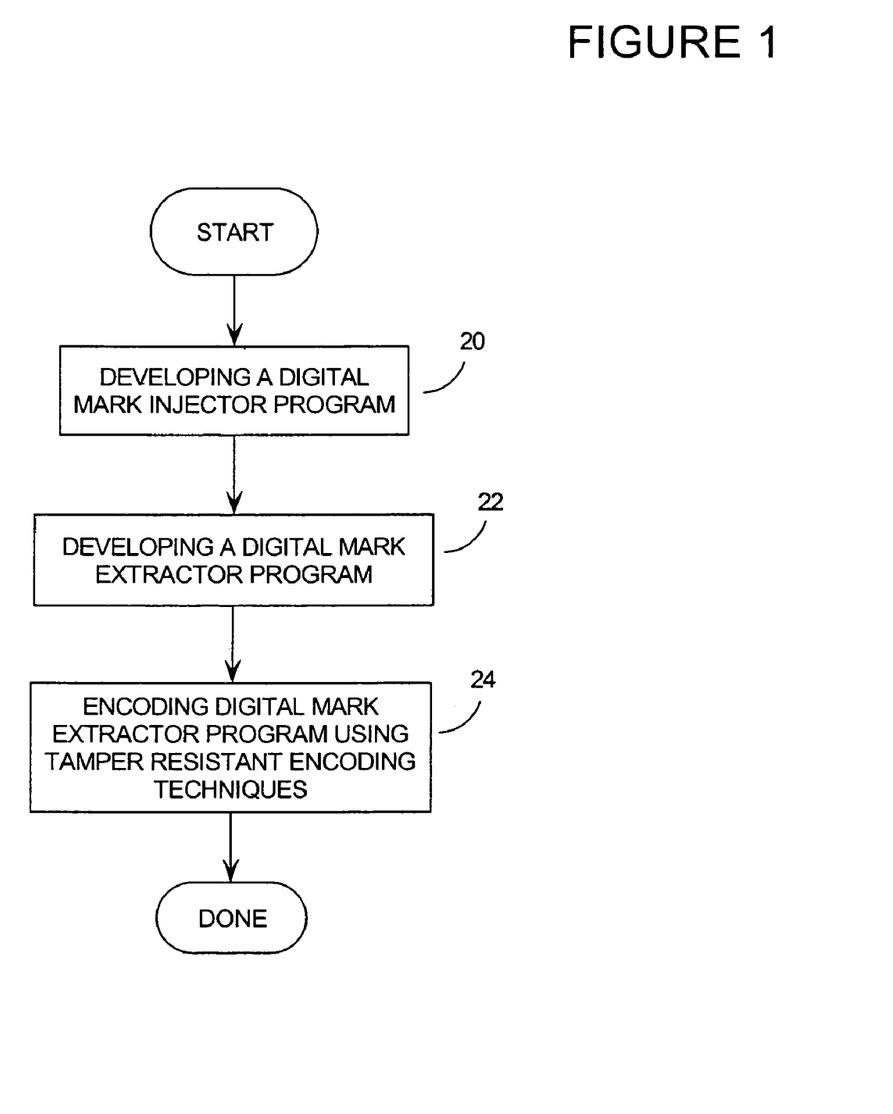
FIG. 1 presents a flow chart of a general algorithm for implementation of the invention.

A methodology which addresses the objects outlined above, is presented as a flow chart of FIG. 1. This figure presents a method for performing digital marking which proceeds generally as follows.

First, developing a digital mark injector program for inserting a digital mark into a digital file at step 20, then developing a complementary digital mark extractor program for identifying that digital mark at step 22. As noted above, digital marking techniques are typically implemented using a complementary pairing of injector and extractor software, the injector software being used to insert the digital mark into a targeted software, data or other digital file, and the extractor program being used to identify the digital mark that was injected into the digital file.

The extractor program is then encoded using tamper-resistant software (TRS) encoding techniques at step 24. Protecting the extractor program using TRS encoding techniques, prevents attackers from analysing the operation of the extractor to the point where digital marks in existing files could be changed, thus preventing the proper owner of the intellectual property, from asserting his rights.

A number of tamper-resistant software (TRS) encoding techniques are known in the art. Encoding software into a TRS form frustrates the attacks of hostile parties in at least the following ways:

1. it generates software which is "obscure"; that is, software whose inner workings are incomprehensible; and
2. it generates software which is "chaotic" in that a modification at any point will almost certainly produce a nonsensical result.

In the context of the invention, the chaos enhances the obscurity by frustrating perturbation analysis (i.e. it roughly corresponds to 'full cascade' in cryptography). Specifically, since watermarking is a form of steganography, it protects against analysis of the watermarking algorithm by fault injection, which has been shown to be an effective attack against cryptographic functions embodied in smart cards, for example.

The obscurity of TRS, and its chaotic response to tampering, are both relative rather than absolute. As in the case of the obscurity provided by cryptography, these properties are removable in principle: however, we can make the required effort for such removal expensive for the attacker. TRS techniques which are particularly effective in digital mark applications are described hereinafter.

Thus, the method of the invention enables a sustainable watermarking strategy in which the watermarking method is kept secret.

The invention will be of most value to an owner who requires a long-term, legally verifiable, watermarking strategy, where many different items will be watermarked, so that the number of forms of watermark is substantial. If the owner decides to employ a secret watermarking method, but also needs the capability of verifying the presence of the watermark in court, the following approach could be used:

1. the owner develops or obtains a series of watermarking methods, each consisting of two algorithms: an injector, which 'marks' an entity with the watermark, and an extractor, which reads out the watermark information. Different injector/extractor pairs are required when it is desirable to have digital marks stored in different patterns, or using different encodings. These different injector/extractor pairs can be said to contain "secret keys" in that each injector/extractor pair will inherently (or explicitly) have data which define the pattern and encoding for that pair. Generic injector/extractor pairs could also be written, which require a user-input key to establish the patterns and encoding parameters of a digital mark;
2. each extractor algorithm is converted into TRS form (a TRS-extractor) which is then:
   a. published; and
   b. registered with a trusted third party; Various forms of publication of the extractor may be used, including Internet publication with download capability whereby the TRS-extractor software can easily be obtained by virtually anyone, or publication on physical media such as floppy disk, cassette tape, or CD ROM, or as program text in a widely recognized source language such as C or Java™;
3. each TRS-extractor is tested by the trusted third party to verify that it recognizes and extracts watermarks from marked items but extracts no watermark from an unmarked (or differently marked) item; and
4. when ownership of an item is in question, the accumulated evidence from the above is available. An already published TRS-extractor, selected by the owner, is applied by an agent of the court to attempt extraction of the watermark. Verification of the watermark, coupled with the accumulated evidence on the reliability of the owner's chosen TRS-extractor, constitutes the owner's means of establishing ownership.

Apart from the usual watermarking concerns (such as preserving quality of the content when the watermark is added, limiting the likelihood of a false positive, having a high level of survivability when the content is modified, etc.), the requirement for making this approach viable is that reversal of the TRS obscurity be prohibitively expensive for the attacker. This is achieved by some combination of the following two methods:

1. the owner can use an extremely heavily protected form of TRS-extractor. Within limits, the TRS-extractor can run slowly and take a lot of space, providing a maximum of freedom in the conversion techniques used to convert the extractor to tamper-resistant form. Also, the more computer resources it costs to run the TRS-extractor, the harder an attack will be: an attacker needs many runs for cracking whereas proof of ownership in court takes just one; and 2. the owner can deploy a large number of different injectors and extractors, so that the expense of compromising any given watermark is multiplied by the number of TRS-extractors which the owner has published.

In this implementation, the injectors may be kept a secret, as the TRS-extractors may be legitimized independently of the injectors. However, other implementations are also possible, such as preparing TRS versions of both an injector and an extractor.

The shortcoming of this technique (making a TRS-encoded injector program available to the public) would be that an attacker may be able to obtain useful information by comparing the operation of the injector and extractor algorithms, knowing that they are complements of one another. In fact, an attacker could inject a watermark into a blank digital file and obtain a perfect mapping of the digital mark. Thus, such an implementation would almost invariably be applied with a secret key input by the user at run time, the secret key dictating the pattern of the digital mark, and the encoding parameters.

The method of the invention may be applied on virtually any computer or microprocessor-based system. An exemplary system on which the invention may be implemented, is presented as a block diagram in FIG. 2. This computer system 30 includes a display 32, keyboard 34, computer 36 and external devices 38.

Figure 2:
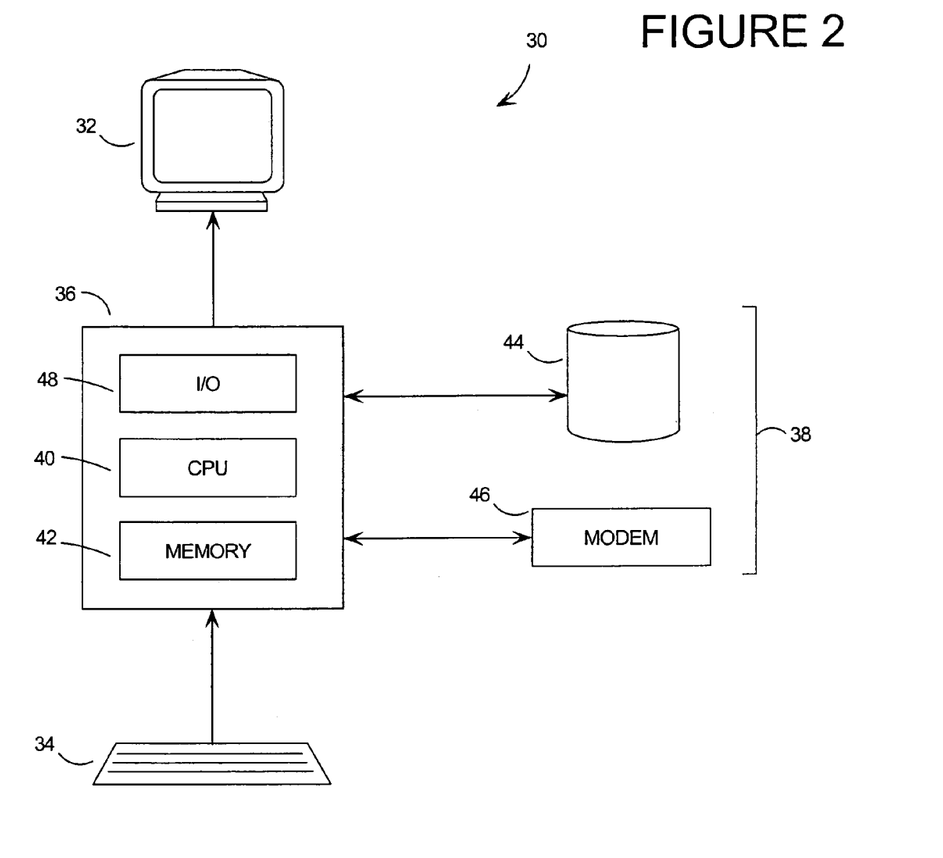
FIG. 2 presents an exemplary computer system in which the invention may be embodied.

The computer 36 may contain one or more processors or microprocessors, such as a central processing unit (CPU) 40. The CPU 40 performs arithmetic calculations and control functions to execute software stored in an internal memory 42, preferably random access memory (RAM) and/or read only memory (ROM), and possibly additional memory 44. The additional memory 44 may include, for example, mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 44 may be physically internal to the computer 36, or external as shown in FIG. 1.

The computer system 30 may also include other similar means for allowing computer programs or other instructions to be loaded. Such means can include, for example, a communications interface 46 which allows software and data to be transferred between the computer system 30 and external systems. Examples of communications interface 46 can include a modem, a network interface such as an Ethernet card, a serial or parallel communications port. Software and data transferred via communications interface 46 are in the form of signals which can be electronic, electromagnetic, optical or other signals capable of being received by communications interface 46. Multiple interfaces, of course, can be provided on a single computer system 30.

Input and output to and from the computer 36 is administered by the input/output (I/O) interface 48. This I/O interface 48 administers control of the display 32, keyboard 34, external devices 38 and other such components of the computer system 30.

The invention is described in these terms for convenience purposes only. It would be clear to one skilled in the art that the invention may be applied to other computer or control systems 30. Such systems would include all manner of appliances having computer or processor control including telephones, cellular telephones, televisions, television set top units, point of sale computers, automatic banking machines, lap top computers, servers, personal digital assistants and automobiles.

TRS Encoding Techniques

There are many TRS encoding techniques known in the art. These techniques may generally be categorized as follows:

1. Cloaked data-flow concerns TRS implementation of ordinary computations on small pieces of data—the building blocks of larger computations;
2. Cloaked control-flow concerns TRS implementation of software decision making and the structure of execution, which glues all larger computations together from smaller pieces;
3. Cloaked mass data concerns TRS implementation of concepts such as files, arrays, dynamic allocation, and linked structures with potential aliasing; and
4. White-box encoding concerns TRS encoding of functions and transforms for an environment in which the software is fully-accessible.

It is somewhat misleading to divide encoding techniques out in this manner. The above categories, while they are handled in different ways, are generally not handled in isolation. A significant degree of control-flow protection is achieved using data-flow encoding techniques, for example.

We prefer that TRS be much more than simply obscure. It should also resist tampering. That is, it should preferably be aggressively fragile under tampering, so that attempts to change its functionality result, not in the desired change, but in useless pieces of nonsense code. (Avoiding a visible point of failure prevents leakage of information about why the functionality has become nonsense.) The techniques described herein, have this property.

As with encryption, the mapping from original form (plaintext or ordinary software, respectively) to encoded form (ciphertext or TRS, respectively) is one way: it is very much easier to encrypt or cloak, respectively, than to decrypt or de-cloak, respectively, unless the secret information used in encrypting or cloaking is known.

However, the conversion of software into TRS form is not a form of encryption. Encrypted messages are useless without a key. In contrast, TRS is software which can do its job perfectly well while remaining in TRS form. This is a significant difference, and means that the applications of cryptography and the applications of TRS are orthogonal and complementary: each does something that the other cannot.

Data-Flow Encoding

By data-flow, we mean the 'ordinary computation' of a program: addition, subtraction, multiplication, division, Boolean computations, masking operations, and the like: the scalar data-flow of a program.

There are two primary aspects of data-flow encoding: obscuring the computation to hide the data which the computation manipulates, and making the computations aggressively fragile under tampering.

The obscuring is achieved by various data encodings. Even very simple encodings can provide a great deal of protection. Our simplest encoding is of the form $x'=sx+d$, where x is original and $x'$ is cloaked. That is, at each point in the targeted program where the variable x appears, it is replaced with its encoding. When this is done for a large number, or all, of the variables in the targeted program, the resulting code will bear little resemblance to the original code.

An attacker may be able to deduce how unprotected software code operates because variables are generally defined with respect to "real-world" concepts and measures, and the equations will often look familiar. However, when the same program is protected by data-flow encoding, the variables will lose their "real-world" appearance, as will the equations. Thus, an attacker will not be able to obtain any useful information from a simple review and analysis of the encoded program.

Many other data flow encodings may also be made. To perform a cloaked addition of constant c to variable x, we simply interpret x' according to x'=sx+(cs+d)—no actual code is needed. Plainly, then, no unique mapping from a cloaked program to an original program exists.

To add a variable instead of a constant, we need actual code, but the transform space for addition using a 64-bit implementation is over 100 bits; a brute-force attack on a space of this size is plainly infeasible (a brute-force attack is one in which all possible combinations of data values are checked until the correct one has been discovered). The mappings we use in practice vary from the simple transformations above, to complex multidimensional transforms combining multiple mathematical domains. This approach is highly effective for obscuring the data-flow.

The other aspect of data-flow cloaking for TRS is to induce aggressive fragility under tampering. This is achieved by generating code according to the following policies:
1. every computation depends on as many others as possible. This may be done simply by creating new variables which are defined as a combination of original variables;
2. the interdependencies are complex, so that, with high probability, an arbitrary change causes invalid computation to occur;
3. execution is 'fake robust': invalidities do not cause failure; execution simply continues in the form of nonsense computation. If, for example, an array A is known to have 100 elements, then converting the expression A [i] to the expression A [i mod 100] makes it fake-robust in that variable i may take on any value and not cause an array bounds error. However, certain values of variable i may cause nonsensical operation elsewhere in the program without causing a complete failure; and
4. any directed change to behaviour (i.e., any change whose result is not nonsense computation) requires that several changes, related in obscure and complex ways, be performed absolutely perfectly.

Further information on this subject is available in the co-pending patent application titled: *Tamper Resistant Software Encoding*, filed under the Patent Co-operation Treaty on Jun. 8, 2000, under Serial No. PCT/CA00/00678, by Stanley Chow, Harold Johnson, and Yuan Gu.

Control-Flow Encoding

The control-flow of a program refers to the decision points and branch instructions that govern which lines of code in the program are to be executed. In broad terms, control-flow encoding increases tamper-resistance by adding fake-robust, data-driven, control transfers to the software code. If a large number of control transfers are added to the software code, it will be extremely difficult for the attacker to identify the specific line of control that he wishes to analyse or modify.

Generally, control-flow encoding ensures that what was one control transfer, has been instantiated in multiple parts of the code, and that control transfers from different parts of the code are often merged into one. As the added control transfers are fake-robust, the erroneously modified program will appear to continue executing properly, while in fact it is not. Since control is exercised using a complex data-driven scheme, any attempt to modify a single control transfer will almost certainly affect others (this is described as the "anti-hologram" property), especially where multiple control transfers are often combined into one (the "togetherness" property), as they are in this invention.

As well, if the attacker makes a number of modifications, by the time the erroneous operation is discovered, it will not be possible to tell which of the modifications caused the erroneous operation.

Figure 3:
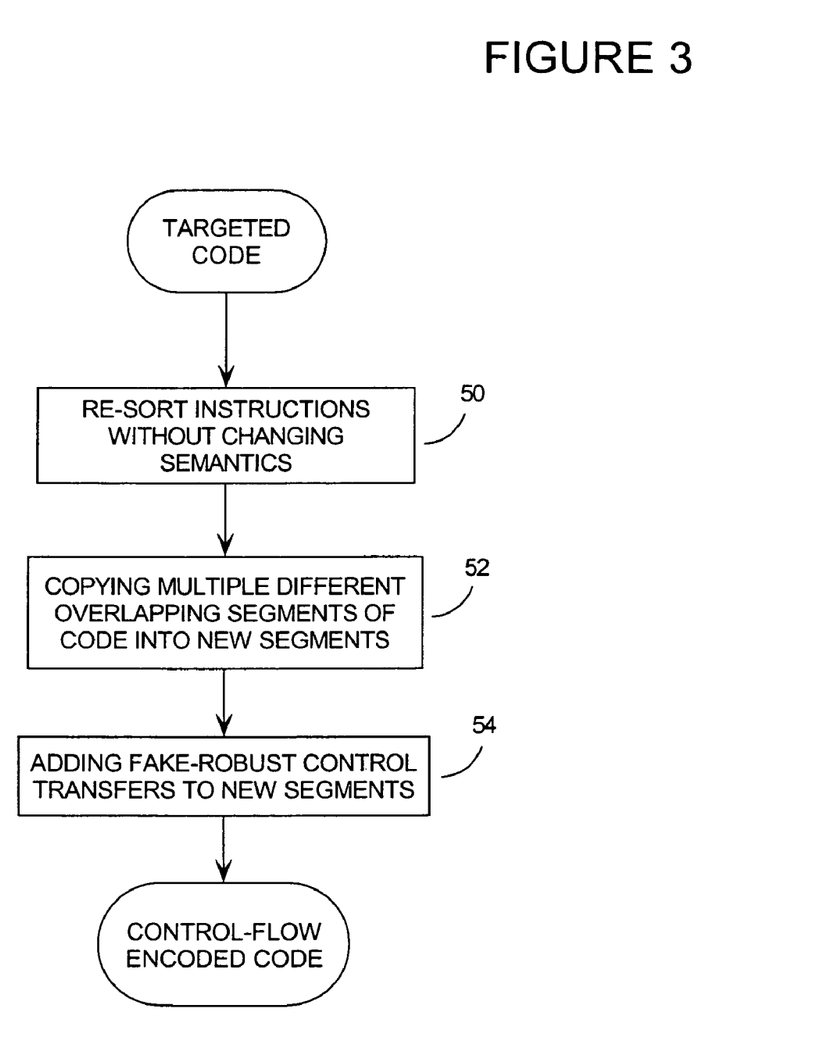
FIG. 3 presents a flow chart of a method for performing control-flow encoding in an embodiment of the invention.

The general implementation of control-flow encoding is presented as a flow chart in FIG. 3. First, at step 50, the operations in the targeted code, preferably in SSA (single-static assignment) or similar intermediate form, are re-sorted without changing the semantics of the program. When the code is in an intermediate form, the interdependencies of the intermediate statements are clear and the bounds on what re-sorting could be performed may be easily determined. The understanding of these interdependencies is what allows multi-threading and optimisation techniques as known in the art. SSA is a very commonly used intermediate form.

In the case of the invention, these instructions can be re-sorted so that a direct decompiling into high level language yields obscure results. However, an enormously greater benefit is realized with the synergy between re-sorting of the code and the creation of "fake-robust" targets at step 54. A fake-robust target is one which will appear to operate correctly when it is modified, but in fact, results in nonsensical operation.

The strategies and limitations for re-sorting the code instructions will vary between applications, and with the type of intermediate code that is used. These restrictions would be clear to one skilled in the art.

At step 52, the re-sorted code is copied into multiple different segments. For example, in a contiguous sequence of ten successive instructions, six distinct segments of five contiguous instructions each, may be identified (namely, the pieces comprising instructions 1 to 5, 2 to 6, 3 to 7, 4 to 8, 5 to 9, or 6 to 10 of the original sequence of ten instructions). Of course, many more distinct segments may be selected from the sequence of ten instructions by choosing segments of different lengths. Some of the selections will consist of segments or sequences of segments that will correctly mirror the functionality of the original program.

At step 54, new control transfer instructions are added to make reference to the new code segments created at step 52. These references will generally be fake-robust as they refer to the segments of the original code that were slightly modified at step 52, but will not be perfectly fake robust unless measures are taken to ensure they will not fail. Fault-resistant programming techniques are known in the art and could be implemented as desired or required.

The targeted code is now protected by control-flow encoding.

Additional details on control-flow encoding may be found in the co-pending patent application titled: *Tamper Resistant Software—Control-flow Encoding*, filed under the Patent Co-operation Treaty on Aug. 18, 2000, under Serial No. PCT/CA00/00943; inventors: Stanley Chow, Harold Johnson, and Yuan Gu.

When applied extensively, control-flow encoded software is cloaked so that:
1. each original operation is represented, variously cloaked, at multiple cloaked sites;
2. a single cloaked site also represents multiple original sites;
3. there is no difference between 'decoy' and 'significant' computation;
4. cloaked routines do not preserve the boundaries of the original routines;

5. execution paths include a pseudo-random component: any change in input data causes pervasive changes to branch patterns;
6. both data- and control-flow are made fake robust: the tampering does not cause failure (traps, core dumps, error messages, or the like): it simply causes execution to continue in a nonsense fashion; and
7. all aspects of control-flow are subjected to all aspects of data-flow cloaking.

This protects the control-flow of the targeted software from standard attacks as follows:
1. Branch jamming will not work because:
   a. no specific branch can be found to jam,
   b. jammed branches subvert the operation of the data-flow functions, producing nonsensical data-flow; and
   c. multiple sites require jamming, with sizable changes to their data-flow, to achieve the effect of a single branch jamming in the original program; and
2. simplification of the control-flow encoded software is extremely difficult because:
   a. due to various data-flow cloakings, distinct sites which share 'original' functionality have quite different code;
   b. data-flow coding mixes dependencies and hence, entropy among functionalities at each site, and the mixing must be fully understood before simplification is possible;
   c. simplification requires removal of the pseudo-random component from branches, but it appears indistinguishable from the normal components (see comment on NP-hardness below);
   d. simplification requires unraveling of both the branching and the data-flow together; and
   e. almost any perturbation-based analysis on control-flow, in effect, involves branch jamming, and will fail as branch jamming will fail.

Mass Data Encoding

To convert large data structures into TRS form (arrays, linked structures, file buffers, and the like), we cloak them so that:
1. the information in the large data structures, and the addresses at which they are stored, are meaningless without the accessing code. The cloaked data structures themselves have and meaning for the data; and
2. uncloaked information appears nowhere; all aspects of such data always appear in cloaked form.

Our approach is general, and covers file input and output (I/O) as well as in-memory data structures, dynamic data structures, and aliasing.

Mass data encoding relies on the random or pseudo-random dispersion of data being stored, throughout the available memory or an area of the available memory. This dispersion makes it very difficult for an attacker to locate certain pieces of data he is searching for, and also distributes the data values with respect to one another. Thus, data are not stored in areas of the memory one might expect them to be, and there are no clearly identifiable blocks or patterns of data in the memory.

A simple technique for performing mass data encoding is to respond to a request to store a data value at a virtual address, by mapping that virtual address onto a randomly selected actual address. This mapping may be done in a truly random manner, but will generally be done in a pseudo-random manner, because of the difficulties in generating truly random numbers in pure software. A desirable technique for generating pseudo-random address is by use of a hash function, which generates what appears to be a random number from a given input. In the formal sense, the definition of a hash function is somewhat more restrictive, but it is clear in this case that any function may be employed which maps a given input onto a random or pseudo-random output.

Each time the encoded software routine is executed, it would access the stored data transparently because the pseudo-random mapping is built into the encoded program. This could allow a patient attacker to monitor all memory lookups and generate a mapping table, however, if the software routine was also protected using data and control-flow encoding, it would virtually impossible to do so.

By storing data in a dispersed manner through the available memory space, it is impossible for an attacker to obtain anything meaningful from analysing the stored memory. In the prior art, data is stored in successive or adjacent memory locations, but in the case of the invention, the memory-wise spacial relationship has been removed, and the data is now dispersed in a pseudo-random manner.

As noted above, this dispersion makes it difficult for an attacker to locate certain pieces of data he is searching for, but also distributes the data values with respect to one another. Thus, data are not stored in areas of the memory one might expect them to be, and there are no clearly identifiable blocks or patterns of data in the memory.

For example, one avenue of attacking an encrypted memory is to search for repetitious patterns. In a text document which is encrypted with a single key, a given word will appear as the same encrypted data, each time it occurs in the original document. Thus, the attacker can identify a block of encrypted code which appears to be repeated often in the memory and assume that it corresponds to a commonly used word. The attacker would start by identifying the statistically most common words, calculating a corresponding key, and determining whether the rest of the encoding makes sense in terms of that key. In English, candidates for a short encoding might include, for example: "the", "is", or "if".

With mass data encoding, each of the letters in these short words could be stored in dispersed locations in the memory. Thus, when the word "the" is stored, the codes corresponding to these three letters will not appear together, but be randomly dispersed throughout the memory. There is therefore no repetition of a code pattern in the mass data storage, for an attacker to exploit.

The following mass data encoding techniques may also be used to complement the main invention. These additional techniques may be applied collectively, or independently to obtain varying degrees of security:
1. using different hashes for different data addresses, making it more difficult for the attacker to correlate different codings;
2. varying the hashes and encryption keys while the target program is running, so that an attacker obtains no benefit from decoding only a part of the routine, at some point in time;
3. encrypting the data being stored; and
4. using data flow encoding of the address and data before even beginning the mass data encoding. In this way, the data and addresses are encoded at all times and unprotected data is never exposed.

Additional details on mass data encoding appear in: *Tamper Resistant Software—Mass Data Encoding*, filed under the Patent Co-operation Treaty on Apr. 12, 2001, under Serial No. PCT/CA01/00493); inventors: Stanley Chow, Harold Johnson, and Yuan Gu.

White-Box Encoding

White-box encoding concerns cryptographic computation which can be observed in complete detail without revealing internal data such as a secret key.

Most security software is designed under the assumption that the software will be applied in a secure environment, that is, in a black-box model. This is generally unrealistic, and as a result, most security software cannot withstand a concerted attack. The "white-box" encoding model assumes that an attacker will have complete access to the targeted software, and thus, the algorithm itself must be protected against analysis and modification.

The white-box techniques of the invention provide ways to make finding an embedded cryptographic key or other hidden information combinatorially difficult for the attacker, even under this severe threat model. Such methods are inherently bulkier and slower than software designed under a black-box model, but in digital mark extraction applications, the tradeoff is well worthwhile.

Figure 4:
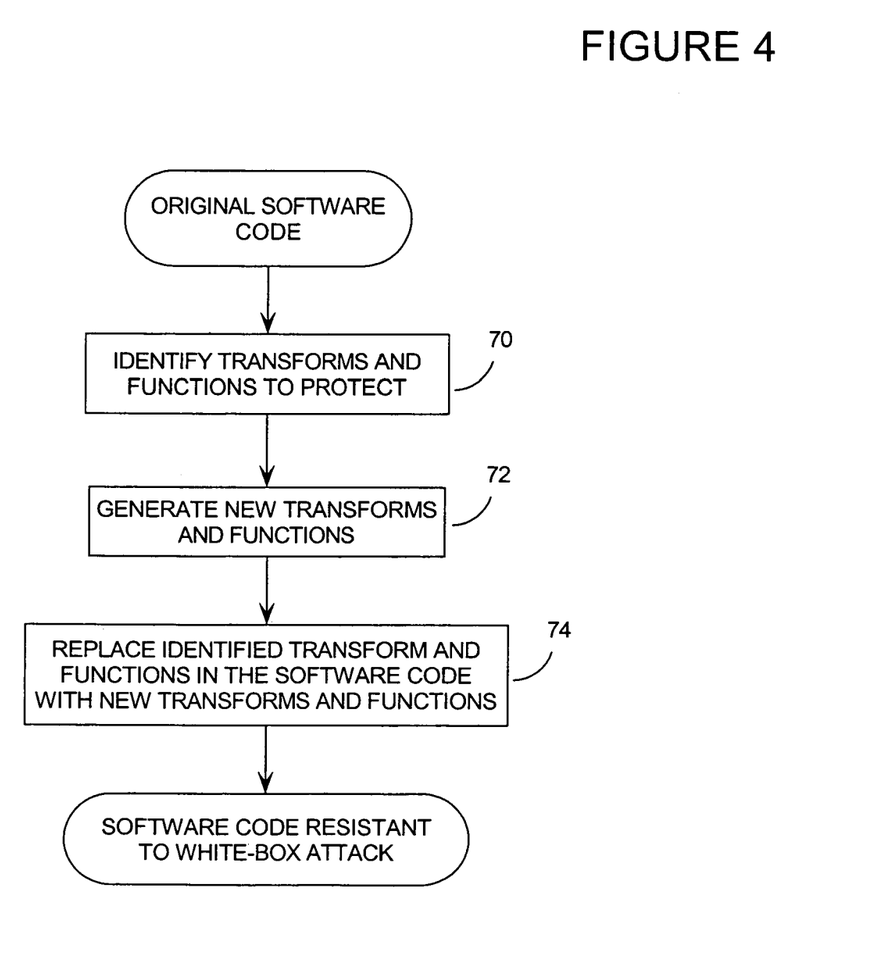
FIG. 4 presents a flow chart of a method for performing white-box encoding in an embodiment of the invention.

In broad terms, white-box encoding is implemented by as shown in the flow chart of FIG. 4. Firstly, functions and transforms substantive to the targeted software program are identified at step 70. Next, new functions and transforms which alter the processing activity visible to the attacker are generated at step 72. The identified functions and transforms are then replaced with the new functions and transforms in the software program at step 74.

A large number of different techniques may be used to encode the functions and transforms identified at step 70. These techniques may be grouped generally as follows:

1. making transforms non-linear, so they cannot be reduced by an attacker;
2. making processing activity disappear, by generating new transforms that eliminate data (such as constants) and processing steps (such as combining two transforms together into one);
3. generating new, spurious, processing activity, by concatenating random transforms to real ones, and performing input and output encodings that introduce processing activity completely unrelated to the original data; and
4. encoding and widely diffusing sites of information transfer and/or combination and/or loss.

For example, a linear transform can be replaced with a simple lookup table. If unused portions of the lookup table are filled with random data, then the lookup table becomes non-linear and irreducible.

Lookup tables can also be partitioned so that they are accessed by concatenated input variables; that is, the table is indexed by the values of two variables, concatenated together. This has the effect of replacing two variables with a single variable having a lookup table which will generally be non-linear. If a lookup table is generated for a transform concatenated with a random transform, then the lookup table will almost certainly be non-linear and irreducible.

Hence, the invention can be employed to protect any manner of software from being analysed, reversed-engineered, or simply observed to discover secure data such as secret keys. Secret keys can then be incorporated into software programs without the danger of the secret key being disclosed, or the program being altered to do anything other than what it was originally intended to do. As noted above, many digital marking algorithms employ secret keys to the extent that they contain secret data which defines the pattern of memory locations for the digital mark data, the parameters of any encoding, and the content of the digital mark itself.

More details on these and other white-box encoding techniques are described in the co-pending patent application titled *System and Method for Protecting Computer Software from a White Box Attack*, filed under the Patent Co-operation Treaty on Dec. 10, 2001, under Serial No. PCT/CA01/01729; inventors: Stanley Chow, Harold Johnson, and Philip A. Eisen.

Preferred Application of TRS Techniques to Digital Marks

Typical watermark extraction algorithms rely on data (which may be regarded as a secret key) indicating where and how the watermark is concealed in the watermarked data. Thus, data encoding is highly desirable in most applications.

Generally, watermark extractors do not have a critical decision branch like a password checker would. The watermark is typically a visual image which says something like "Property of OwnerCo, Chicago, Ill. Watermarked on Apr. 1, 2001". If the print is legible and says something like the above, it makes it likely that the court will accept that the instance really is OwnerCo's property. So the extractor simply extracts the image, without making any judgment as to whether it bolsters the owners legal claims. It is up to the court whether or not the image in fact does so.

Thus, there is not a single branch statement that relies on control-flow encoding, though of course, it would still be desirable to obfuscate the control-flow of the extractor algorithm.

The typical extractor program may also contain mass data structures, though this depends very much on the particular watermark extraction algorithm. For example, in some cases, the secret key (i.e. the data which defines the pattern of memory locations for the digital mark data, the parameters of any encoding, and the content of the digital mark itself) may be stored as a mass data structure. In other cases, the watermark algorithm may depend on large mathematical tables generated in advance for computing certain functions, which also are good candidates for mass data encoding.

The key point about having the full armamentarium of encoding techniques as described above (data-flow, control-flow, mass data, whitebox encoding), is that it permits us to cover a correspondingly wide spectrum of watermark extraction algorithms.

CONCLUSIONS

A 'normal' watermarking approach reveals the watermarking algorithm when it is applied for legal enforcement of property rights. A TRS-based approach, however, allows this enforcement to be done without revealing the algorithm to the public.

Further to *Attacks on copyright marking systems*, 2nd Workshop on Information Hiding, LNCS vol. 1525 (isbn 3-540-65386-4), pp. 218-238; by Fabien A. P. Petitcolas, Ross J. Anderson, and Markus G. Kuhn, 1998, it becomes clear that an effective watermarking method must adjust itself to the nature of the content and not just its format (such as jpeg, mp3, or text). As well, the actual content within that format, and the context in which the content is expected to be used, is relevant in determining what marking approach, or what combination of approaches, to employ.

It follows that TRS encoding such as that provided by the invention is necessary to preserve such complex, diverse, context-sensitive, data-sensitive extraction algorithms, or assemblages of algorithms. Without using TRS, this cannot be done.

For example, unless a TRS-extractor is used, any publication of the extractor reveals its methods. Moreover, the third party entrusted with testing the extractors becomes a potential point of leakage for the marking techniques, even if they were otherwise kept secret. TRS permits the owner to prove to a court that:

1. the owner is not cheating, by publishing the various TRS-extractors in advance, and 2. that the watermark is truly present, by means of evidence from the trusted third party that the TRS-extractor performs as is claimed, and by means of the TRS-extractor's extraction of the watermark.

While particular embodiments of the present invention have been shown and described, it is clear that changes and modifications may be made to such embodiments without departing from the true scope and spirit of the invention.

It is understood that as de-compiling and debugging tools become more and more powerful, the degree to which the techniques of the invention must be applied to ensure tamper protection, will also rise. As well, the concern for system resources may also be reduced over time as the cost and speed of computer execution and memory storage capacity continue to improve.

These improvements in system resources will also increase the attacker's ability to overcome the simpler tamper-resistance techniques included in the scope of the claims. It is understood, therefore, that the utility of some of the simpler encoding techniques that fall within the scope of the claims, may correspondingly decrease over time. That is, just as in the world of cryptography, increasing key-lengths become necessary over time in order to provide a given level of protection, so in the world of the instant invention, increasing complexity of encoding will become necessary to achieve a given level of protection.

As noted above, it is also understood that computer control and software is becoming more and more common. It is understood that software encoded in the manner of the invention is not limited to the applications described, but may be applied to any manner of the software stored, or executing.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

It would also be clear to one skilled in the art that this invention need not be limited to the existing scope of computers and computer systems. Portable music devices such as mp3 players, video disk players such as DVD players are just two such devices that are commonly used with watermarked data content.

What is claimed is:

1. A method of ensuring that a digital document is verifiable as being from a specific source, thereby rendering ownership protection for content of the digital document, the method comprising the steps of:
    (a) providing a watermark injector in the form of a watermark injection algorithm embodied in stored on a computer readable storage medium, the watermark injector operating to steganographically embed a watermark into the digital document whereby a key is employed in the embedding of such watermark;
    (b) providing a complementary watermark extractor in the form of a watermark extraction algorithm embodied in stored on a computer readable storage medium, the watermark extractor operating to reverse the watermark injector's steganographic embedding of a watermark by extracting such embedded watermark from the digital document;
    (c) injecting a digital watermark into the digital document using the watermark injector and a randomly selected key;
    (d) converting the watermark extractor into tamper-resistant software (TRS) form, whereby the TRS form of the watermark extractor is obscure and has a property of responding chaotically to modification;
    (e) publishing the TRS form of the watermark extractor; and,
    (f) registering the TRS form of the watermark extractor with a trusted third party, whereby the trusted third party validates that the TRS form of the watermark extractor correctly identifies watermarks injected using the watermark injector but does not identify a watermark in content of a digital document which either does not possess it or which was embedded with the watermark using a different injection algorithm and/or a different key;
    whereby in a legal proceeding, the owner of content of the digital document has available as evidence to prove such ownership, each of the following; (i) the prior publication of the TRS form of the watermark extractor; (ii) the third party validation of the correctness of the TRS form of the watermark extractor; and, (iii) an ability to provide in such legal proceeding a demonstration of the TRS form of the watermark extractor extracting the watermark from the content; and, without it being necessary to reveal the injection algorithm, the extraction algorithm, or the key used in embedding the watermark.

2. A method according to claim 1 whereby the provided watermark injector is selected from a plurality of distinct watermark injectors and the provided complementary watermark extractor is selected from a corresponding plurality of distinct complementary watermark extractors, the selection of the provided injector and extractor for the content being random, and whereby varied injectors and extractors are provided for different content thereby making it necessary for an attacker to select from a plurality of published TRS forms of the plurality of extractors for any particular content targeted by such attacker and increasing the difficulty for such an attacker to determine appropriate injection and/or extraction algorithms for such targeted content.

3. A method according to claim 2 whereby the randomly selected key is embedded in the watermark injection algorithm and in the complementary watermark extraction algorithm.

4. A method according to claim 3 whereby the conversion of the watermark extractor is performed using a highly secure method of conversion to TRS whereby the TRS form of the watermark extractor has a high computational overhead and the degree of obscurity and chaotic response to modification of the TRS form of the watermark extractor are increased, thereby further increasing the difficulty for such an attacker to determine appropriate injection and/or extraction algorithms for such targeted content, and without preventing the owner of the content from proving ownership thereof.

* * * * *

UNITED STATES PATENT AND TRADEMARK OFFICE
CERTIFICATE OF CORRECTION

| | | |
|---|---|---|
| PATENT NO. | : 7,395,433 B2 | Page 1 of 1 |
| APPLICATION NO. | : 10/478696 | |
| DATED | : July 1, 2008 | |
| INVENTOR(S) | : Stanley T. Chow et al. | |

It is certified that error appears in the above-identified patent and that said Letters Patent is hereby corrected as shown below:

Column 13, line 60, claim 1, delete "embodied in";

Column 14, line 2, claim 1, delete "embodied in".

Signed and Sealed this

Sixteenth Day of September, 2008

JON W. DUDAS
*Director of the United States Patent and Trademark Office*